United States Patent
Martin et al.

(10) Patent No.: US 7,065,763 B1
(45) Date of Patent: Jun. 20, 2006

(54) METHOD OF REDUCING CONTENTION OF A HIGHLY CONTENDED LOCK PROTECTING MULTIPLE DATA ITEMS

(75) Inventors: Brian James Martin, Redmond, WA (US); Michael Ryan, Redmond, WA (US)

(73) Assignee: EMC Corporation, Hopkinton, MA (US)

( * ) Notice: Subject to any disclaimer, the term of this patent is extended or adjusted under 35 U.S.C. 154(b) by 983 days.

(21) Appl. No.: 09/675,396

(22) Filed: Sep. 29, 2000

(51) Int. Cl.
*G06F 9/46* (2006.01)

(52) U.S. Cl. .................................... 718/102; 718/100

(58) Field of Classification Search ............ 718/1–108
See application file for complete search history.

(56) References Cited

U.S. PATENT DOCUMENTS

| | | | | |
|---|---|---|---|---|
| 5,596,754 A | * | 1/1997 | Lomet | 710/200 |
| 5,678,024 A | * | 10/1997 | Wagar et al. | 711/129 |
| 5,826,081 A | * | 10/1998 | Zolnowsky | 718/103 |
| 5,956,712 A | * | 9/1999 | Bennett et al. | 707/8 |
| 6,334,134 B1 | * | 12/2001 | Haderle et al. | 707/205 |
| 6,338,063 B1 | * | 1/2002 | Barr | 707/8 |
| 6,530,079 B1 | * | 3/2003 | Choi et al. | 717/158 |
| 6,754,656 B1 | * | 6/2004 | Cornwell et al. | 707/8 |

* cited by examiner

*Primary Examiner*—Meng-Al T. An
*Assistant Examiner*—Kenneth Tang (74) *Attorney, Agent, or Firm*—William J. Daley, Jr., Esq.; George N. Chaclas, Esq.; Edwards Angell Palmer & Dodge, LLP (57) ABSTRACT

Featured is a method or process for reducing contention of a highly contended software lock(s) that is protecting multiple data items, where the software has a plurality of code paths accessing the data items. The method includes creating additional partition locks to protect subsets of the data items protected by the existing global lock. Such a method further includes acquiring all partition locks and the global lock, wherever a global lock would have been acquired to protect data. The method also includes identifying one or more heavily used code paths and determining which data items are touched by the identified one or more heavily used code paths. These data items are then moved into a partition, if they were not partitioned earlier. The locking requirements for each of the identified one or more heavily used code paths are optimized to match the reduced locking requirements because of the partitioned data items. In other words the locking requirements are reduced so only the locks for the partitions including the data items that touch the code path are acquired. In more specific embodiments, the so-modified software is evaluated to determine if there is an acceptable increase in overall system performance resulting from the optimization of the locking requirements. If the modified system's performance is not acceptable, then the next most heavily used code path is identified and the locking requirements for this code path are optimized. Such optimization is continued until the system exhibits an acceptable overall system performance or all code paths are optimized.

22 Claims, 7 Drawing Sheets

METHOD OF REDUCING CONTENTION OF A HIGHLY CONTENDED LOCK PROTECTING MULTIPLE DATA ITEMS

FIELD OF INVENTION

The present invention relates to methods and processes for protecting multiple data item using locks and more particularly to a method/process for reducing the contention of a lock(s).

BACKGROUND OF THE INVENTION

Many current computer systems employ a multi-processor configuration that includes two or more processing units interconnected by a bus system and each being capable of independent or cooperative operation. Such a multi-processor configuration increases the total system processing capability and allows the concurrent execution of multiple related or separate tasks by assigning each task to one or more processors. Such systems also typically include a plurality of mass storage units, such as disk drive devices to provide adequate storage capacity for the number of task executing on the systems.

One type of multi-processor computer system embodies a symmetric multiprocessing (SMP) computer architecture which is well known in the art as overcoming the limitations of single or uni-processors in terms of processing speed and transaction throughput, among other things. Typical, commercially available SMP systems are generally "shared memory" systems, characterized in that multiple processors on a bus, or a plurality of busses, share a single global memory or shared memory. In shared memory multiprocessors, all memory is uniformly accessible to each processor, which simplifies the task of dynamic load distribution. Processing of complex tasks can be distributed among various processors in the multiprocessor system while data used in the processing is substantially equally available to each of the processors undertaking any portion of the complex task. Similarly, programmers writing code for typical shared memory SMP systems do not need to be concerned with issues of data partitioning, as each of the processors has access to and shares the same, consistent global memory.

Figure 1:
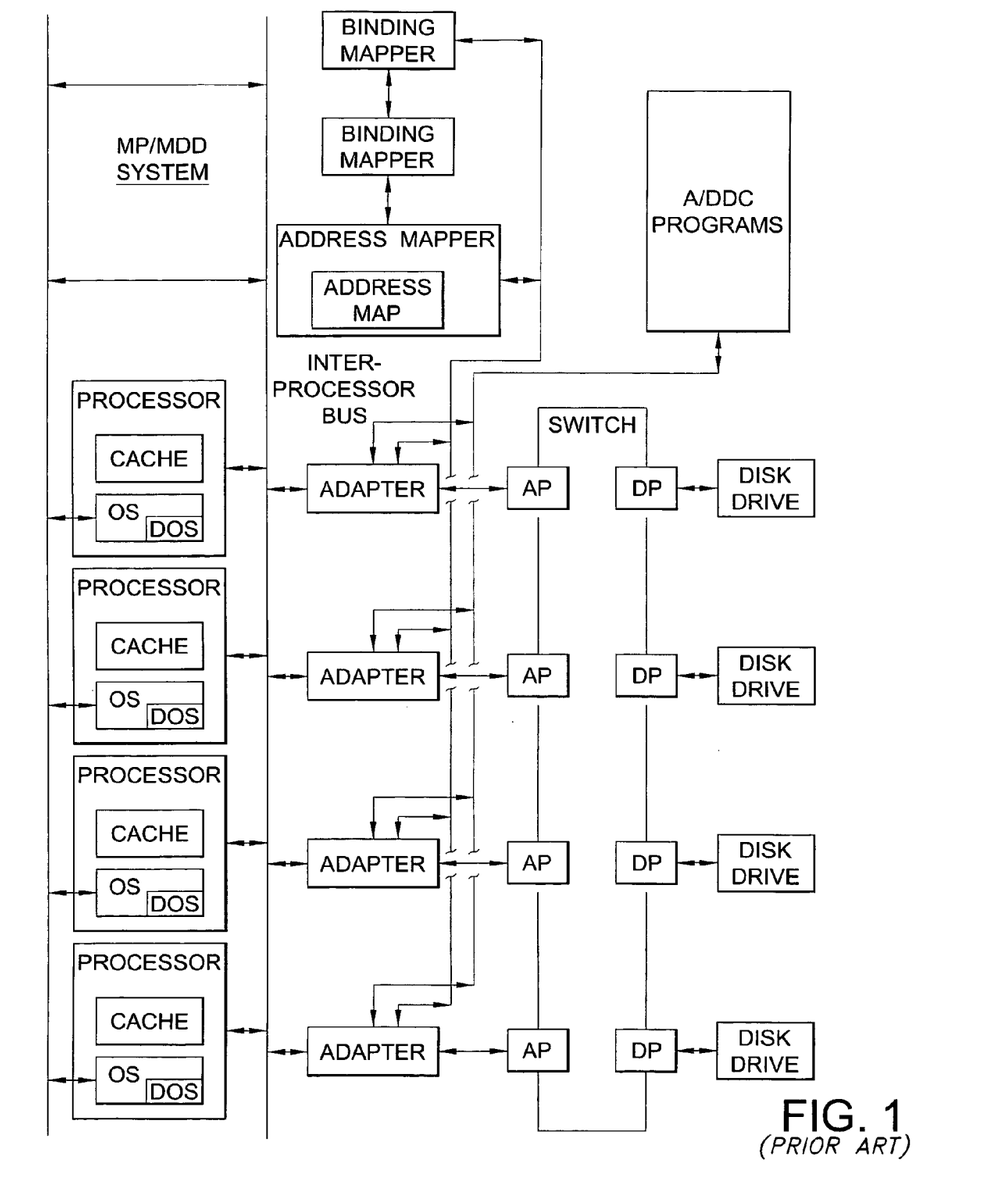
FIG. 1 is a block diagram of an exemplary multiprocessor system that implements a SMP architecture.

There is shown in FIG. 1 a block diagram of an exemplary multiprocessor system that implements an SMP architecture. For further details regarding this system, reference shall be made to U.S. Ser. No. 09/309,012, filed Sep. 3, 1999, the teachings of which are incorporated herein by reference.

Another computer architecture known in the art for use in a multi-processor environment is the Non-Uniform Memory Access (NUMA) architecture or the Cache Coherent Non-Uniform Memory Access (CCNUMA) architecture, which are known in the art as being an extension of SMP but which supplants SMPs "shared memory architecture." NUMA and CCNUMA architectures are typically characterized as having distributed global memory. Generally, NUMA/CCNUMA machines consist of a number of processing nodes connected through a high bandwidth, low latency interconnection network. The processing nodes are each comprised of one or more high-performance processors, associated cache, and a portion of a global shared memory. Each node or group of processors has near and far memory, near memory being resident on the same physical circuit board, directly accessible to the node's processors through a local bus, and far memory being resident on other nodes and being accessible over a main system interconnect or backbone. Cache coherence, i.e. the consistency and integrity of shared data stored in multiple caches, is typically maintained by a directory-based, write-invalidate cache coherency protocol, as known in the art. To determine the status of caches, each processing node typically has a directory memory corresponding to its respective portion of the shared physical memory. For each line or discrete addressable block of memory, the directory memory stores an indication of remote nodes that are caching that same line.

Figure 2:
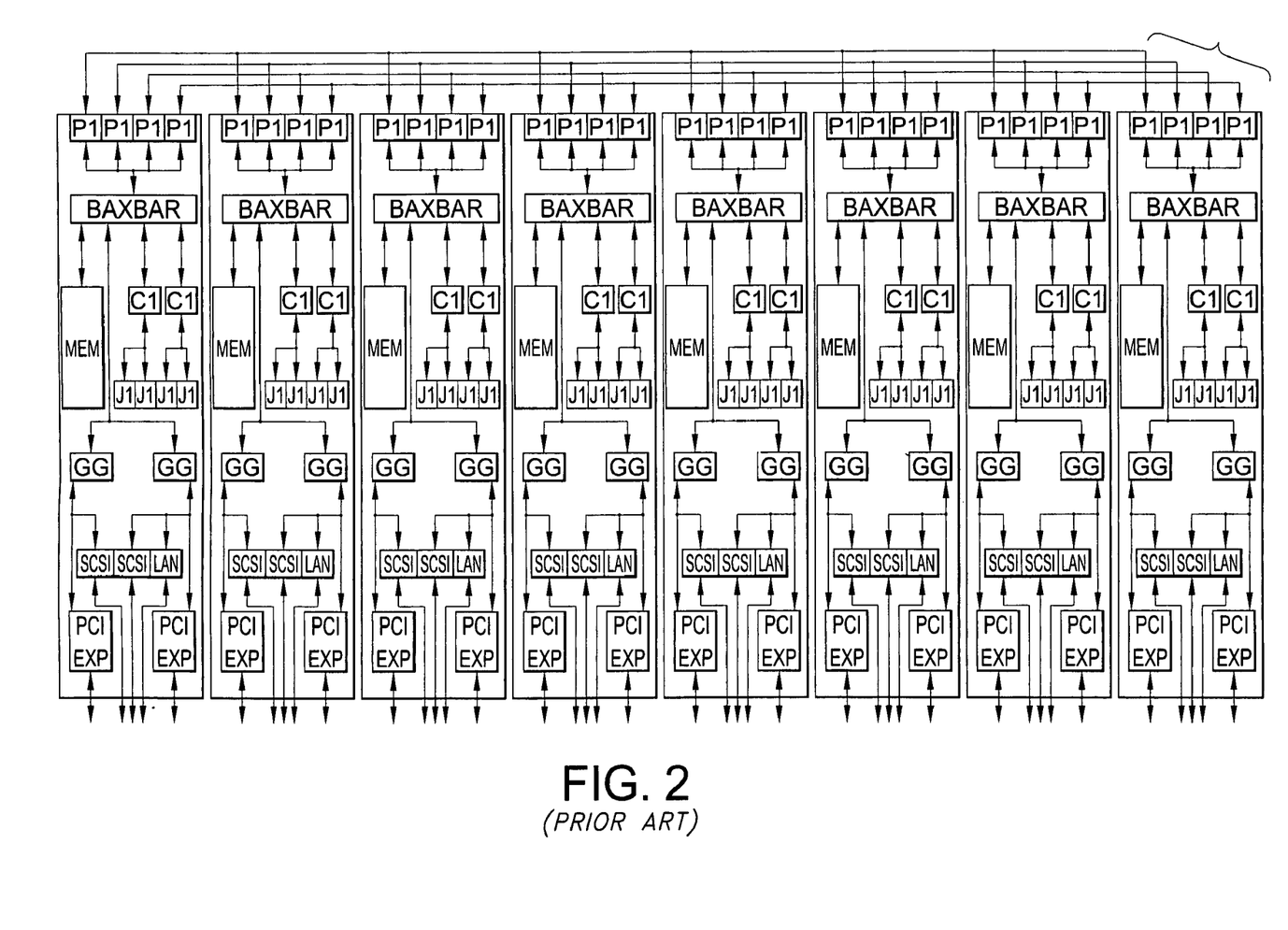
FIG. 2 is a high-level block diagram of another exemplary multiprocessor system that implements a CCNUMA architecture

There is shown in FIG. 2 a high-level block diagram of another exemplary multiprocessor system but which implements a CCNUMA architecture. For further details regarding this system, reference shall be made to U.S. Pat. No. 5,887,146, the teachings of which are incorporated herein by reference.

The operating systems for such multiprocessor systems or the user application(s) for execution on such multiprocessor systems can employ a methodology whereby a lock is used to protect multiple data items, and/or multiple instances of a data item that are in the memory (e.g., RAM) of the multiprocessor system. For example, a data set that includes the telephone number for a user(s), user name(s) and addresses of the user(s). Each time the operating system or user application accesses the data or data items in memory, such as for a read or a writing operation, a global lock is acquired (STEP 2, FIG. 3) over the data/data items. After the global lock is acquired, the user application or operating system accesses the data/data items for example in one of a read/write operation (STEP 4, FIG. 3). After accessing the data/data items, the global lock is released (STEP 6, FIG. 3).

Figure 3:
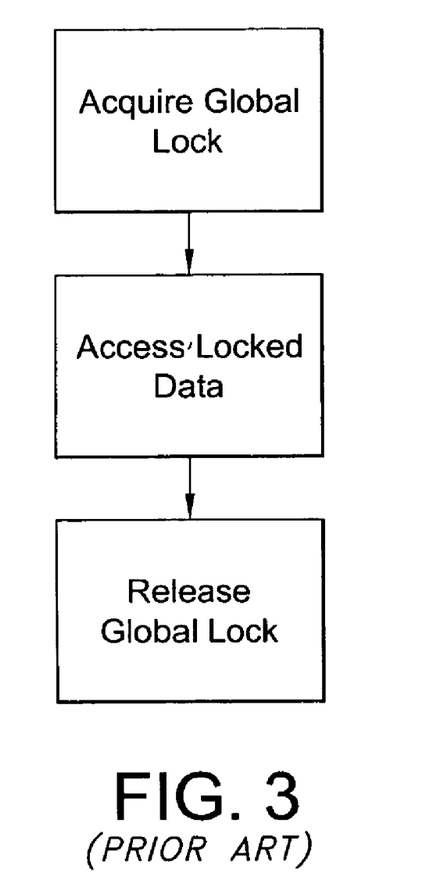
FIG. 3 is a flow diagram of a conventional technique for protecting data stored in memory.

The foregoing process shown in FIG. 3 is intended to ensure that the data or data items are not changed during the time period when the data is being accessed, for example, for a read or write operation. In other words, more than one read/write operation cannot be performed at the same time. After the global lock is released the operating system or user application can perform this process again for the next or another accessing of data/data items.

Although this techniques is simple, acquiring a global lock each and every time data is to be accessed for a read/write operation for example, becomes increasingly more time consuming as more concurrent accessing operations are initiated and therefore contend for the lock. As also indicated above, while the accessing of data in the memory for one given accessing operation is being performed, other accessing operations trying to access the same data cannot be performed, thus the applications programs/operating system/processors involved with such other accessing operations are unable to proceed (i.e., operation pended or delayed). Further, in the case where the global lock is obtained over a data set comprising multiple data items, the other accessing operations can be for data items not involved with the one given accessing operation being performed.

For example, lets assume that the data being stored in the memory is a phonebook type of listing, that includes name, address and telephone number of all subscribers, and which is accessed by any one of a number of operators to obtain listing information to give to callers. When one operator accesses the data for one subscriber, a global lock is obtained over the data for all subscribers. Similarly, if a person is updating the data provided for a given subscriber, a global lock is obtained over all of the data for all subscribers until the updating operation is completed and the global lock released. Consequently, the next operator attempting to access the data must await the release of this global lock before the next accessing of the data can proceed.

If one or more applications programs and/or the operating system that are being run on a multiprocessor system require or involve frequent accessing of common data in the memory, then the various data accessing operations can become in competition with each other. As a consequence, the competing data accessing operations can cause the processing of the one or more data operations to be delayed. Consequently, the time to perform a task by an applications program and/or an operating system is in effect increased. Although the foregoing is described in connection with specific multiprocessor system implementations, it should be recognized that similar time delays can occur in other multiprocessor system configurations in which an applications program or operating system experiences data access global lock contention as described herein.

It thus would be desirable to provide new methodologies or techniques for optimizing applications programs and/or operating systems so as to reduce such global lock contentions while ensuring the data being accessed from the memory is not corrupted or changed during the time period when the data is being accessed. Further, it would be desirable to provide such methods that would reduce the amount of time to perform tasks being performed by the applications program or operating systems as compared to prior art methods and techniques.

SUMMARY OF THE INVENTION

The present invention features a method or process for reducing contention of a highly contended software lock(s) that is protecting multiple data items, where the software has a plurality of code paths accessing the data items. The method includes identifying one or more heavily used code paths and determining which data items are touched by the identified one or more heavily used code paths. These data items are then moved into a partition, if they were not partitioned earlier.

The locking requirements for each of the identified one or more heavily used code paths are optimized to match the reduced locking requirements because of the partitioned data items. In other words, the locking requirements can be reduced so only the locks for the partitions including the data items that touch the code path are acquired. Such a method further includes acquiring all partition locks and the global lock, wherever a global lock would have been acquired to protect data.

In more specific embodiments of the present invention, the so-modified software is evaluated to determine if there is an acceptable increase in overall system performance resulting from the optimization of the locking requirements in a selected one or more heavily used code paths. If the system's performance following optimization is not acceptable, then the next most heavily used code path is identified and the locking requirements for this code path are optimized. Such optimization is continued until the system exhibits an acceptable overall system performance or all code paths are optimized.

According to another aspect of the present invention, the method or process for reducing contention of a highly contended software lock that is protecting multiple data items is arranged so as to optimize the locking requirements for each of the code paths of the software.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

As noted above, the software developed for operating systems and/or applications programs for execution in computer systems, particularly multiprocessor computer systems, include locks protecting multiple data items of a data set or multiple instances of a data item. Such locks are typically referred to as global locks that protect one or more sets of data. For purposes of the present invention, the contents of the set of data or data set can be any of a number of data items known to those skilled in the art. Further, although the following may be seen as describing a methodology for optimizing already written software, it should be recognized that the methodology and techniques of the present invention can be implemented or effected so as to be performed in conjunction with the writing of the code for software.

It also shall be understood that the software comprising applications programs or operating systems includes one or more code paths that access data protected by a global lock. In more specific embodiments, the software includes a plurality or multiplicity or more of such code paths. For purposes of the present invention, a software code path according to the present invention begins at a location in the software code that acquires the global lock, and ends when the global lock is released. As such, each code path ordinarily employing such conventional locking techniques would involve the locking and unlocking of all items within the data set before and after respectively accessing the locked data much in the fashion illustrated in FIG. 3. Also, the data set can comprise one or more data items that can be accessed across multiple code paths. In more specific embodiments, the data set includes four or more data items.

Figure 4:
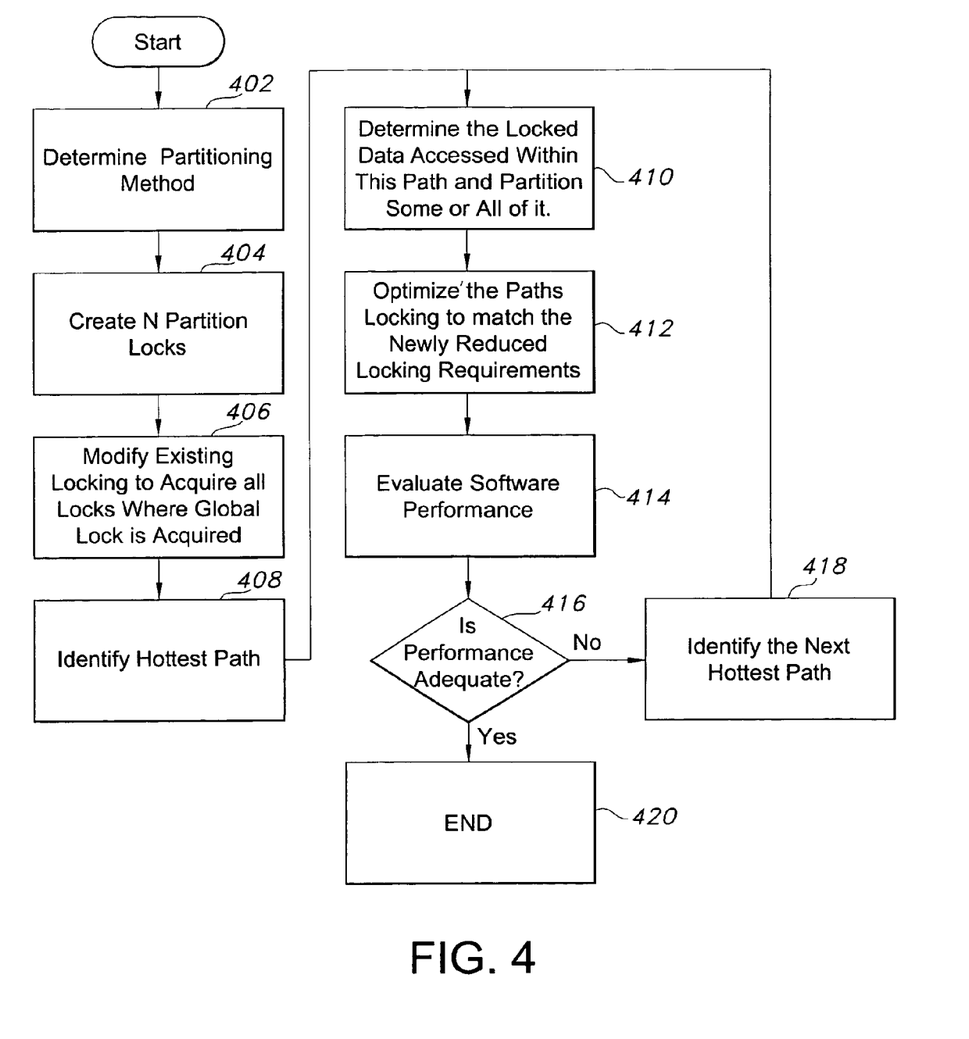
FIG. 4 is a high-level flow diagram illustrating the process or method of the present invention for optimizing an applications program or operating system.

There is shown in FIG. 4 a high-level flow diagram that illustrates the process or method of the present invention for optimizing the software for an applications program or operating system so as to reduce the contention of a highly contended lock, a global lock, protecting multiple data items. The present method begins by determining the methodology by which the data set is to be partitioned, STEP 402.

As indicated above, when using conventional techniques a programmer(s) or a software designer(s) typically provides a global lock in each code path accessing a data set in the memory (RAM) of a computer system to protect all of the data contained in the data set. It should be recognized that the data or contents of such a data set do not particularly limit a method according to the present invention.

In accordance with the method of the present invention, a programmer(s) or software designer(s) evaluates any one or more of the computer system and/or the particular operational characteristics, functions and tasks of the software as well as the data of the data set, including the kind and type of data, that is stored in the system memory (RAM, SDRAM, etc.) of the computer system. From this evaluation, the programmer determines how to in effect divide or partition this stored memory into subsets or partitions. In general terms, the number of data subsets or partitions and the definition of the contents of each subset or partition are established so as to provide a mechanism to redefine the locking requirements of one or more code paths of the software. The redefinition of the locking requirements of one or more code paths, further provides a mechanism for reducing contention of a highly contended lock that would have been provided if one used conventional software techniques for accessing data for the one or more code paths. The following provides some exemplary data set/system configurations and some exemplary partitioning schemes that one skilled in the art might contemplate for use in connection with the methodology of the present invention. Such discussion also further describes the methodology of the present invention.

In the case of a NUMA type of computer system, such a system typically includes a plurality of processing nodes or physical locales and distributed global memory, where each processing node includes a portion of the global memory. Each processing node, or a group of processing nodes, has near and far memory, the near memory being accessible to the node's processors through a local bus and far memory at other processing nodes and being accessible over a main system bus or other interconnect. Although there is near and far memory for such a system, when applying conventional techniques for protecting data in a data set a global lock would be applied across the entire distributed global memory to protect the data within the data set.

Assume also for example, that the function or tasks being performed at each processing node, involves the use of data that resides in the near memory of each processing node. In such a case, the number of data subsets or partitions and the definition of the contents of each data subset or partition is related to the number of physical locales or processing nodes of the NUMA computer system and the data already found in the near memory of each processing node. In other words, the number of partitions and the contents of each partition are determined based on the physical arrangement and number of the NUMA processing nodes and the way in which data is already distributed and stored in the global memory of the NUMA computer system. Thus, for example, the data in the memory of the first processing node would be partitioned from the data in the memory of the second and subsequent processing nodes.

In the case of a data set comprising an information listing, for example a phonebook type of listing, one of the fields of data may include information that inherently provides a mechanism or way of sub-dividing the data into discrete subsets. For example, in the case of the phonebook-listing example the number and definition of each data subset can be based on the alphabet and the first letter of the last name of the telephone subscribers. Thus, for example, the data comprising the phonebook listing would be partitioned so the data corresponding to all listings having last names beginning with A would be partitioned from the data corresponding to all listings having last names beginning with B–Z (i.e., the other letters of the alphabet).

In addition, the partitioning of the data set can be determined or established based on a consideration of a specific parameter or specific data field that is utilized in the software code for one or more code paths. Referring to the phonebook information listing, a particular applications program can include a number of code paths to perform various tasks or functions, including updating the listing for changes in subscribers (adds/deletes/revisions) and reading of the telephone number for a given subscriber name and address. Also assuming that the heaviest code path from a usage standpoint is that involving the reading of the telephone number, then the data in the data subset would be partitioned so as to be capable of using the data field that would have the most impact on reducing contention. As with the above, the number and definition of the data subsets or partitions can be based on the alphabet and the first letter of the last name of the telephone subscribers.

In the case of an operating system, suppose there exists a system for managing a range of memory, where each page in the range is described by a structure that contains some information on the status and/or contents of that page. Using a conventional technique for protecting data, a single global lock would be utilized to protect the many instances of the page descriptor structure. In the present method, N partitions would be created and the instances of the page descriptor structure would be divided among the N partitions. In this way, a partition is defined as a range of memory and the items associated with that memory range.

In sum, such partitions are not particularly limited to a particular form. Further such partitions, in exemplary embodiments, can be set so as to correspond or relate to a set of processors of a multiprocessor computer system, correspond or relate to a physical memory range, correspond or relate to a specific existing relationship amongst the data within the data set or be entirely conceptual in nature with no physical basis. The concept of a partition in the present invention refers to the set of data locked only by a particular partition lock, and specifically does not imply any rearrangement or relocation of the data itself.

Figure 5A:
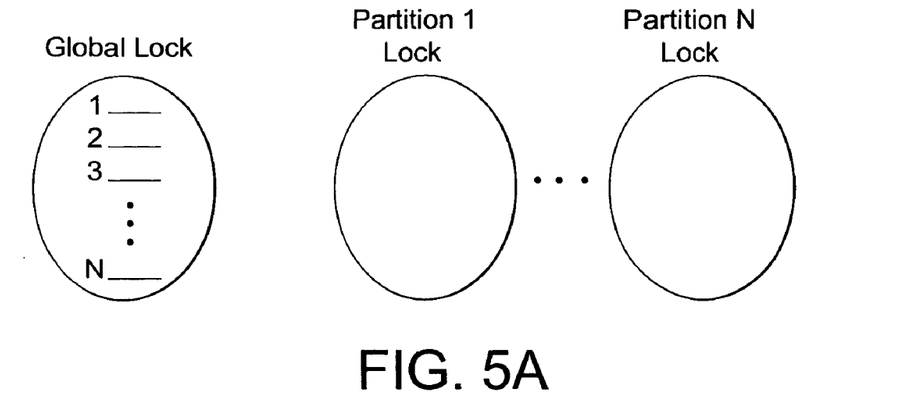
FIGS. 5A–C are illustrative of various states of software being optimized.

After determining the partitioning method, N partition locks are established or created in the software for one or more data sets in the system memory (RAM) to be accessed in the one or more code paths of the software, step 404, where N is ≧2. Such partition locks are created with the same locking mechanism employed by the original global lock or using any other technique known to those skilled in the art that is otherwise compatible with the software code being modified or written. There is shown in FIG. 5A, the state of the software with the data set protected by the global lock and the newly created, empty partitions and the associated partition locks.

Figure 5B:
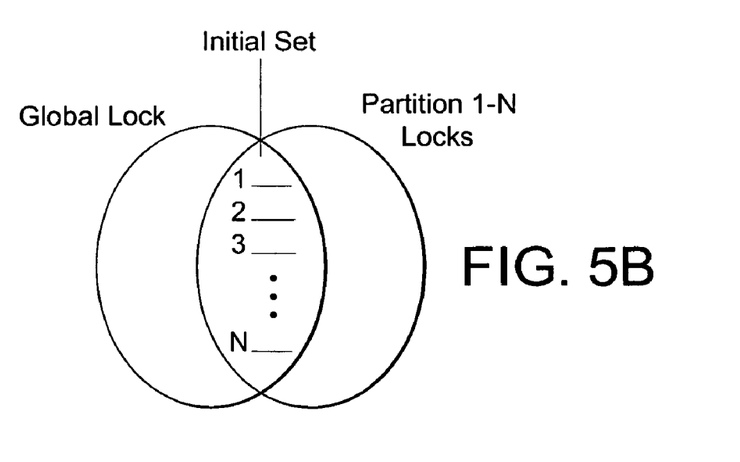

Following the creation of the N partition locks, the software is modified or is written such that wherever the global lock was acquired, all N partition locks and the global lock are now acquired, Step 406. With this provision in the software, the data comprising the original, or initial, data set is effectively defined so as to be protected by both the global lock and all of the partition locks. The state of the software with the data set protected by the global lock and the newly created, empty partitions and the associated partition locks is illustrated in FIG. 5B.

Because a plurality of locks may be held at the same time in any one or more code paths, when creating the partition locks the software also shall include a locking hierarchy as is known to those skilled in the art to prevent deadlock scenarios. In an illustrative embodiment, when acquiring multiple locks, the lowest numbered partition lock is acquired first and other locks are acquired in order through the highest numbered partition lock and the global lock is acquired last. A higher numbered partition lock, or the global lock, can be acquired when a lower numbered partition lock is held. If a lower numbered partition lock than one that is already held must be acquired, then the higher numbered partition locks are released and reacquired in the manner described above. The locks can be released in any order. As indicated above, the concept of a locking hierarchy is well understood in the field of computer science, see for example, J. W. Havender, Avoiding Deadlock in Multitasking Systems, IBM Systems Journal 7,2 (1968), 74–84

Figure 6:
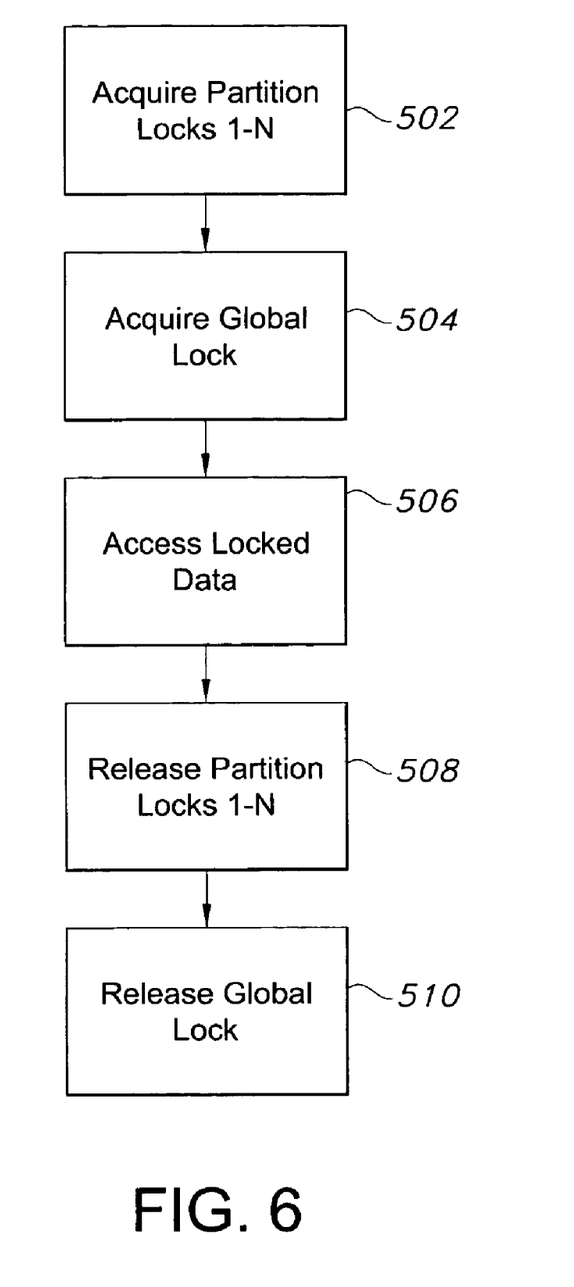
FIG. 6 is a flow diagram of the lock-all locking routine.

Referring now to FIG. 6, there is shown the code path from FIG. 3 but which is modified to include acquiring and releasing of the N partition locks according to the established locking hierarchy. As provided in the above-described locking hierarchy, all of the partition locks are acquired, STEP 502, starting with partition #1 and continuing until reaching the Nth partition. Thereafter, the global lock is acquired, STEP 504.

After acquiring all of the partition locks and the global lock, the software includes code for accessing the data in the locked data set, STEP 506. When all of the partition locks and the global lock are acquired, all of the data within the data set is protected such that it does not change while the data within the data set is being accessed. Once data accessing is completed, all of the partition locks are released, STEP 508 and the global lock is released, STEP 510. The modification of the software to acquire all-locks for accessing locked data in the system memory, maintains the software code in an operational state, functionally equivalent to the original state of the unaltered software. Such an operational state of the software is maintained even in cases where other activities or actions are taken in accordance with the teachings of the present invention to optimize locking requirement in selected ones of the plurality or more of code paths.

According to this aspect of the present invention, the software is written/revised so that at least selected ones of the plurality or more code paths thereof are optimized with regards to the locking requirements of these selected code paths so as to reduce the contention for acquiring the locks for accessing data within a data set. Thus, each of the various code paths that are accessing data from a given data set are evaluated to determine the code path which experiences the heaviest use, hereinafter the hottest code path, STEP 408. Such a determination is effected using any of a number of methods or techniques known to those skilled in the art, including, but not limited to instrumentation of the software, such as by the addition of counters; or analysis with commercially available tools such as VTUNE© Intel.

Figure 5C:
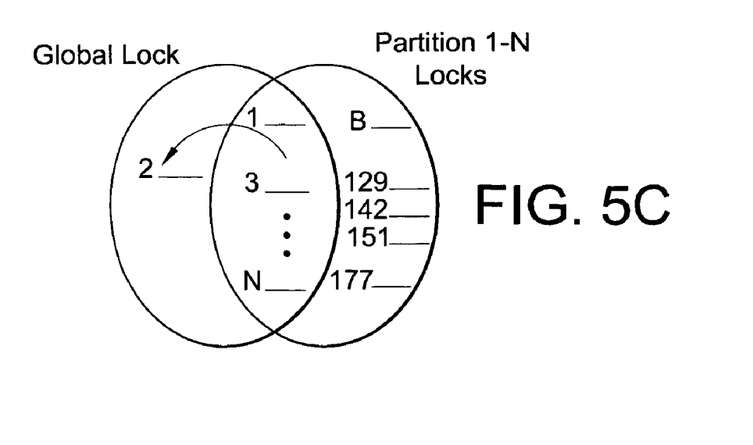

The data of the data set that ordinarily would be completely locked for the identified code path is then evaluated to determine the subset of this locked data set that would be accessed within the identified code path. After identifying this data all or some of the identified subset of the locked data is then partitioned or in effect moved into a partition, STEP 410. Reduction of lock contention according to this aspect of the present invention involves moving items from the initial set to either one of the partition sets, or the global set. A data item is moved by assigning it to a partition, or by determining that no partition makes sense and moving it to the global set. Assigning an item to a partition does not necessarily require a software change because it is simply redefining the locking requirements for that data item. An item placed in a partition may either have an explicit partition number, or be implicitly understood by the software to be in a particular partition. This partition information must be available to the software so it can determine what partition to lock when the item is accessed. When an item is an instantiation of an object, a partition field may be added to the object to explicitly indicate the partition the item resides in. There is shown in FIG. 5C an intermediate state of the data set where some items have been partitioned (i.e., moved to a partition) and others still exist in the initial set. There also is shown in FIG. 5C a data item (i.e., 2_) that is being moved to the global set. In this way, the locking requirements for this item can be reduced from the all-locks configuration (i.e., all partition and global locks) to just the global lock. Because data has been moved to one or more partitions, the global lock does not affect all data of the original data set.

Thus, for the above phonebook example, the data comprising the data set is partitioned in 26 partitions, where the boundaries of each partition is established based on the first letter of the last name of each subscriber. In the case of the above memory management system example, when a software path needs to modify a page descriptor it must be able to determine the partition of the page descriptor so it knows which partition to lock. The page descriptor object structure can be modified to contain a partition field defining the partition that the page descriptor belongs to, or the partition of the page descriptor can be derived from the location of the page within the memory range. Suppose that the global lock in this example also protects a count of the total pages described by these page descriptors. Since the count doesn't conform to any of the partitions, it can be moved to the global set so that only the global lock need be held to access it. Thus, when a path adds a page descriptor it can acquire the global lock, increment the count, and release the global lock while holding the partition lock of the new page descriptor. Alternatively, it may be desirable to create N page count objects where each contains the count of the page descriptors in a partition. These N page count objects can then be moved to their corresponding partitions eliminating the need to acquire the global lock when updating the per-partition page count.

When an item is moved from the initial set to a partition set (i.e., by defining a partition for the item), the locking requirements in the at least selected ones of the software code paths can be reduced. Thus, following data partitioning, the locking requirements for the identified code path are optimized so only the locks associated with the subset of data required for this code path is locked, STEP 412. In other words, the locking requirements of the identified code path is modified from acquiring all locks to acquiring only the locks (i.e., partition locks and/or global lock) needed to lock the data items (i.e., data subsets or partitions) to be accessed in the identified code path. For purposes of the present invention, a software code path according to the present invention, begins at a location in the software code that acquires the global lock (i.e., before the locking is modified), and ends when the global lock is released (i.e., before the locking is modified). The code path can branch and loop, and have multiple release points. The code paths also can share code (i.e., common routines) with other code paths.

As indicated above, after partitioning the data set amongst the N partitions and the global lock set and after optimizing the locking requirements of a code path, the software remains functional or operational. Thus, after optimizing the locking requirements of the identified code path, the programmer(s) or software designer(s) also can perform any or a number of tests on the so-modified software to determine the overall operational performance of the modified software. Such tests can be any of a number of tests known to those skilled in the art, any of a number of tests known in the art that can be adapted for use by any one skilled in the art, or can be developed by one of ordinary skill in the art. The programmer(s) or software designer(s) also evaluate the operational performance of the software to determine if the overall performance of the software is adequate for the intended use, STEPS 414,416. In the case where an existing, working piece of code is being modified or upgraded, the so-modified code is evaluated to determine if the overall operational performance has been improved from the earlier version of the code as intended and/or meets any improvement goals that may have been established, expected or intended. Such testing and evaluation of the operational performance is achievable, because the code path(s) of the code comprising the software that access data which were not optimized, remain in operational condition as a result of the "all locks" code modification of STEP 406. In other words, data can be partitioned and the locking requirements of selected code paths can be optimized because of such partitioning without effecting the operational capabilities of the other non-optimized code paths. Furthermore, this provides a mechanism by which the incremental improvement in overall performance of the software resulting from the optimization of by code path locking requirements can be determined and evaluated. Such evaluation of incremental performance also provides a mechanism to perform a cost-benefit analysis to determine if the incremental increase in performance warrants the time taken to optimize locking requirements for a working piece of software.

As indicated above, the programmer(s) or software designer(s) evaluate the overall performance of the modified software (i.e., applications programs/operating system) so as to determine if the increase in performance is acceptable, STEP 416. If the overall increase is determined to be acceptable (YES, STEP 416) then the programmer(s) or software designers(s) end the process of optimizing the software to reduce the contention of a highly contended lock(s), STEP 420.

If the overall increase is determined not to be acceptable (NO, STEP 416) then the next heaviest code path (i.e., the next hottest code path) is identified, STEP 418. Thereafter, STEPS 410–416 are repeated for the next heaviest code path. This process is repeated until the overall performance of the software is determined to be acceptable YES, STEP 416) or until the optimization process has exhausted all code paths accessing data of the date set. Thereafter, the programmer(s) or software designers(s) end the process of optimizing the software to reduce the contention of a highly contended lock(s), STEP 420.

It is not generally necessary to identify and remove all items from the initial set to achieve reduced contention and improved performance. In order to determine the most advantageous items to partition, the most often used paths need to be identified. If these paths have multiple branches, the most commonly taken branches must be identified. The items used by the most commonly called paths and most often taken branches are the items that when partitioned will typically result in the greatest reduction in contention. Thus, when a data item is partitioned it is not necessary to adjust the locking of all paths using or accessing that data item. The paths that are rarely called may continue to lock all partitions because they will have little or no effect on overall contention or overall system performance.

When the locking requirements for a heavily used code path is reduced by partitioning the items it touches, the new locking requirements must be determined and the path modified to only acquire the necessary locks. The correct locking may be any combination of partition locks with or without the global lock, or it may be all locks. The code path determines the correct locking by reading the locales of the items it will touch, or implicitly knowing the partitions of the items it needs locked. The path may or may not be able to determine ahead of time what branch will be taken. It may be possible to lock a known set of needed partitions and wait until later in the path to adjust the locking as needed consistent with the established locking hierarchy. If the items in the path are used in such a way that this is not appropriate then the lock must be acquired at the beginning of the path even if it is not required by the branch that is taken.

In order to reduce the number of partition locks that must be acquired by a particular code path, all the data items used by that code path should be in the same partition. To accomplish this, data items that have an explicit partition number can be dynamically moved from one partition to another at run time. Generally it is necessary to hold the partition lock of both the old partition and the new partition when moving an item. When acquiring the partition lock of a data item that can move between partitions, the partition of the item must be rechecked after the lock was acquired to insure it did not move while it was being locked.

Through this process of moving items out of the initial set and adjusting the locking of the important paths, the so-modified/updated software becomes more distributed and contention for the global lock is reduced. It is useful to note that after each step of partitioning items and optimizing the locking, the software remains in working condition and the performance and lock contention can be measured.

Figure 7:
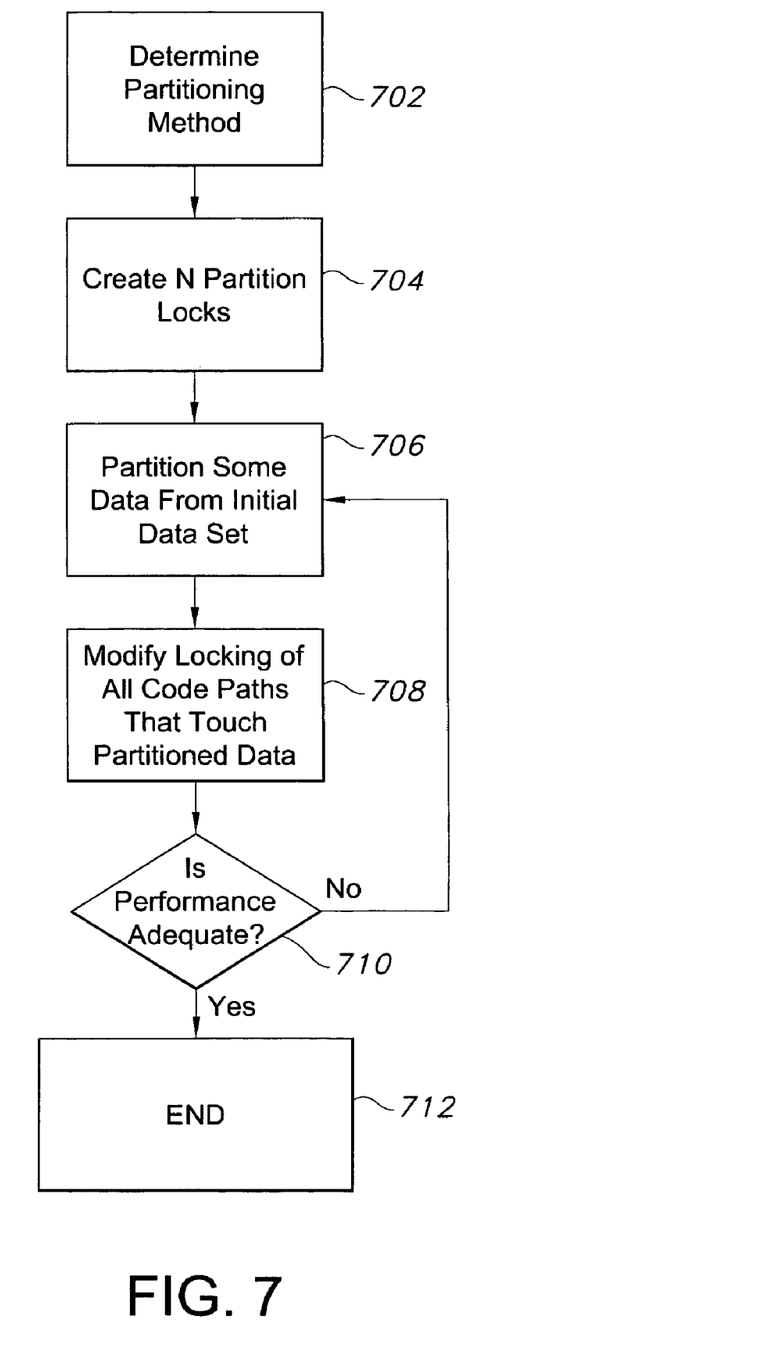
FIG. 7 is a high-level flow diagram illustrating another process or method of the present invention for optimizing an applications program or operating system.

There is shown in FIG. 7 a high-level flow diagram that illustrates another process or method of the present invention This method differs from that of FIG. 5 in that the locking requirements for all code paths accessing the data set stored in system memory are optimized so the software is ideally in a state of optimal locking. For the details of STEPS 702, 704, and 712 reference shall be made to the foregoing discussion regarding STEPS 402, 404 and STEP 420 of FIG. 4.

Following the determination of the partitioning methodology (STEP 702), and the creation of the N partition locks (STEP 704) the process according to the alternative embodiment includes partitioning some of the data set, STEP 706. This also changes the locking requirements for all code paths that touch the newly partitioned data. Reference also shall be made to the foregoing discussion for STEP 410 as to the other details for the partitioning of data.

After partitioning of the data, the locking requirements for all code paths that touch the partitioned data are modified, STEP 708. In other words, each code path is examined and, if necessary, modified to match the new locking requirements. Reference also shall be made to the foregoing discussion regarding STEP 412 as to other details for the modification of the locking requirements of a code path.

After data is partitioned and code paths are changed, the change in overall performance of the software is evaluated to determine if the overall performance of the so-modified software is acceptable or has reached a desired level, STEP 710. If the overall performance of the software is acceptable or reached the desired level (YES, STEP 710) then the programmer(s) or software designer(s) end the process of optimizing the software to reduce contention, STEP 712. Reference also shall be made to the foregoing discussion regarding STEPS 414, 416 as to other details concerning the evaluation and determination of the modified code's acceptability.

If the overall performance is not acceptable or has not reached the desired level (NO, STEP 710), then STEPS 706–708 are repeated until the overall performance of the modified code is determined to be acceptable (YES, STEP 710) or until all of the data has been partitioned. This alternative embodiment has the beneficial effect that after each iteration of partitioning data and modifying code path locking, the locking of all code paths is optimal given the current partitioning of data. In comparison to the methodology illustrated in FIG. 4, in the alternative embodiment, the programmer or software designer does not have the option to only modify the locking requirements of the heaviest or selected code path. Instead, in the alternative embodiment, all code paths are examined on each iteration to insure that the software remains in a working state.

If the software code paths access more than one data set, then either of the foregoing processes is repeated for each data set being accessed.

Although a preferred embodiment of the invention has been described using specific terms, such description is for illustrative purposes only, and it is to be understood that changes and variations may be made without departing from the spirit or scope of the following claims.

What is claimed is:

1. A method for reducing contention of a highly contended software lock protecting data items of a data set, all of the data items being stored in a system memory of a multi-processor computer system, said method comprising the steps of:
    defining partitions within the data set;
    creating N partition locks, one for each partition, where N>2;
    identifying one code path from one or more code paths of a software program that access one or more of the data items;
    determining which data items of the data set are accessible by the identified code path;
    partitioning at least a portion of the data items that are accessible by the identified code path into the partitions; and
    optimizing locking requirements of the identified code path so the locks being acquired and released in the identified code path are those associated with the data items being accessible by the identified code path, wherein the identified code path includes a plurality of branches, and wherein said optimizing includes optimizing the locking requirements of the identified code path so the locks being acquired and released in the code path are those associated with the data items being accessible by each branch of identified code path.

2. The method according to claim 1, further comprising the step of modifying the locking requirements of the one or more code paths of the software program that access one or more of the data items so as to acquire all N partition locks and a global lock where the global lock would have been acquired prior to accessing of the one or more data items and so as to release all N partition locks and the global lock where a global lock would have been released after accessing of the one or more data items.

3. The method according to claim 1, wherein said optimizing includes optimizing the locking requirements of each branch of the identified code path so the locks being acquired and released in each branch are those associated with the data items being touched accessible by said each branch.

4. The method according to claim 1, further comprising the step of evaluating the software program after said optimizing the locking requirements so as to determine if overall performance of the software program is acceptable, wherein the overall system performance is based on reducing contention of the highly contended software lock.

5. The method according to claim 4, wherein in the case where said evaluating determines that the overall performance of the software program is not acceptable, then said method includes identifying another code path of the one or more code paths and repeating said steps of determining, partitioning, optimizing, and evaluating for the another identified code path.

6. The method according to claim 5, wherein the code path first identified is the heaviest used code path and wherein the another code path and subsequent code paths are identified sequentially in the direction from the heaviest used code path to a lesser used path.

7. The method according to claim 1, further comprising the step of first determining a methodology for partitioning the data set.

8. The method according to claim 1, wherein the code path first identified is the heaviest used code path.

9. The method according to claim 1, wherein there is one of a plurality or a multiplicity of code paths that access one or more of the data items.

10. A method for reducing contention of a highly contended software lock protecting data items of a data set, all of the data items being stored in a system memory of a multi-processor computer system, said method comprising the steps of:
    first determining a methodology for partitioning the data set into partitions;
    creating N partition locks, one for each partition, where N>2;
    modifying locking requirements of each of one or more code paths of a software program that access one or more of the data items so as to acquire all N partition locks and a global lock where the global lock would have been acquired prior to accessing of the one or more data items and so as to release all N partition locks and the global lock where the global lock would have been released after accessing of the one or more data items;
    identifying one code path from the one or more code paths of the software program that access one or more of the data items, wherein the code path first identified is the heaviest used code path and wherein the another code path and subsequent code paths are identified sequentially in the direction from the heaviest used code path to a lesser used path;
    next determining which data items of the data set are accessible by the identified code path;
    partitioning at least one of the data items that are accessible by the identified code path; and
    optimizing the locking requirements of the identified code path so the locks being acquired and released in the identified code path are those associated with the data items being accessible by the identified code path;
    evaluating the software program after said optimizing the locking requirements so as to determine if overall performance of the software program is acceptable, wherein the overall system performance is based on reducing contention of the highly contended software lock; and in the case where said evaluating determines that the overall performance of the software program is not acceptable, then identifying another code path of the one or more code paths and repeating said steps of determining, partitioning, optimizing and evaluating for the another identified code path.

11. The method according to claim 10, wherein the identified code path includes a plurality of branches, and wherein said optimizing includes optimizing the locking requirements of the identified code path so the locks being acquired and released in the code path are those associated with the data items being accessible by each branch of identified code path.

12. The method according to claim 11, wherein said optimizing includes optimizing the locking requirements of each branch of the identified code path so the locks being acquired and released in each branch are those associated with the data items being accessible by said each branch.

13. A method for reducing contention of a highly contended software lock protecting data items of a data set, all of the data items being stored in a system memory of a multi-processor computer system, said method comprising the steps of:

defining partitions within the data set;

creating N partition locks, one for each partition, where N>2;

partitioning at least one of the data items into the partitions; and modifying locking requirements of all code paths of the one or more code paths of a software program that access one or more of the data items so that the locks being acquired and released in each of said all code paths are those associated with the accessible data items of each respective partition, wherein one code path of said all code paths includes a plurality of branches, and wherein said modifying includes modifying the locking requirements of each branch of said one code path so the locks being acquired and released in each branch are those associated with the data accessible by said each branch.

14. The method according to claim 13, further comprising the step of evaluating the software program after said modifying the locking requirements so as to determine if the overall performance of the software program is acceptable.

15. The method according to claim 14, wherein in the case where said evaluating determines that the overall performance of the software program is not acceptable, then said method includes partitioning more data items and repeating said steps of modifying and evaluating.

16. The method according to claim 13, further comprising the step of first determining a methodology for partitioning the data set.

17. The method according to claim 13, wherein there is one of a plurality or a multiplicity of code paths that access one or more of the data items.

18. A method for reducing contention of a highly contended software lock protecting data items of a data set, all of the data items being stored in a system memory of a multi-processor computer system, said method comprising the steps of:

first determining a methodology for partitioning the data set;

defining partitions within the data set based upon the methodology;

creating N partition locks, one for each partition, where N>2;

partitioning a plurality of the data items into the partitions;

modifying locking requirements of all code paths of the one or more code paths of a software program that access one or more of the data items so that the locks being acquired and released in each of said all code paths are those associated with accessible data items, wherein the code path first modified is the heaviest used code path and wherein the another code path and subsequent code paths are modified sequentially in the direction from the heaviest used code path to a lesser used path; and evaluating the software program after said modifying the locking requirements so as to determine if overall performance of the software program is acceptable, wherein the overall system performance is based on reducing contention of the highly contended software lock, wherein in the case where said evaluating determines that the overall performance of the software program is not acceptable, then said method includes partitioning more data items and repeating said steps of modifying and evaluating.

19. A method for accessing one or more data items in a data set by a software program, all of the data items being stored in a system memory of a multi-processor computer system, said method comprising the steps of:

defining partitions within the data set;

creating N partition locks, one for each partition, where N>2;

identifying one code path from one or more code paths of the software program that access one or more of the data items;

determining which data items of the data set are touched by the identified code path;

partitioning at least one of the data items that are accessible by the identified code path;

optimizing locking requirements of the identified code path so the locks being acquired and released in the identified code path are those associated with the data items being accessible by the identified code path;

locking the data items of the data set that are touched by the identified code path while keeping unlocked the data items of the data set that are not being accessible by the identified code path;

accessing one or more of the locked data items;

modifying the locking requirements of the one or more code paths of the software program that access one or more of the data items so as to acquire all N partition locks and a global lock where the global lock would have been acquired prior to accessing of the one or more data items and so as to release all N partition locks and the global lock where a global lock would have been released after accessing of the one or more data items; and releasing the locks associated with the locked data.

20. The method according to claim 19, wherein in the case where accessing data in the one or more code paths in which all N partition locks and the global lock are acquired and released, said method further comprising the steps of:

acquiring all N partition locks and the global lock;
accessing the data being protected by the acquired N partition locks and the global lock; and
releasing all N partition locks and the global lock.

21. The method according to claim 19, wherein the identified code path is the heaviest used code path that accesses data items.

22. The method according to claim 19, wherein locking requirements for a plurality of code paths are optimized, and wherein said acquiring, accessing and releasing are selectively effected in any one of the plurality of code paths provided that the data items to be locked in said any one code path are not locked in any other of the plurality of code paths.

* * * * *